Aug. 27, 1968   F. E. NUTTALL ET AL   3,398,834
REVERSE OSMOSIS WATER PURIFICATION APPARATUS AND CELL THEREFOR
Filed Oct. 10, 1966   2 Sheets-Sheet 1
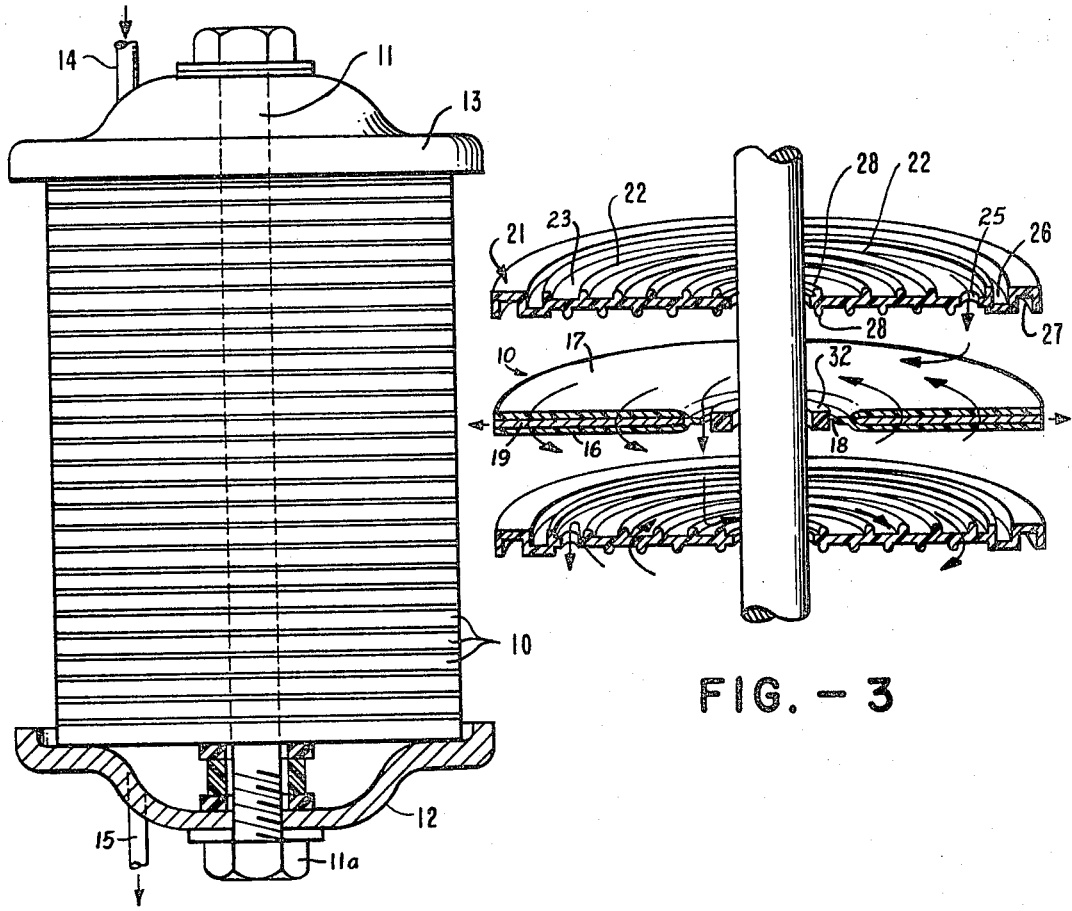
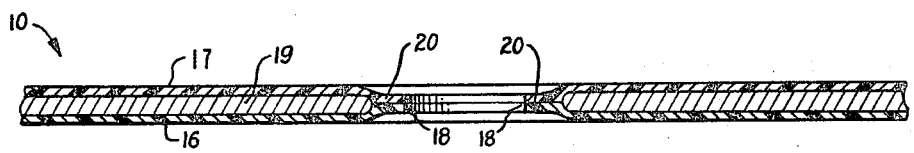
INVENTORS
FLEET E. NUTTALL
PAUL A. CANTOR
BY Edward O. Ansell
George J. Netter
ATTORNEYS Aug. 27, 1968    F. E. NUTTALL ET AL    3,398,834
REVERSE OSMOSIS WATER PURIFICATION APPARATUS AND CELL THEREFOR
Filed Oct. 10, 1966    2 Sheets-Sheet 2
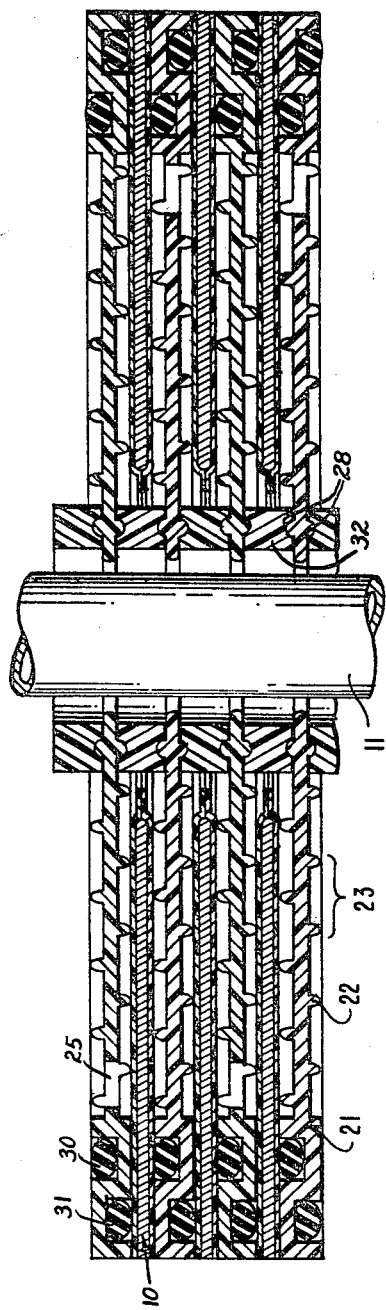
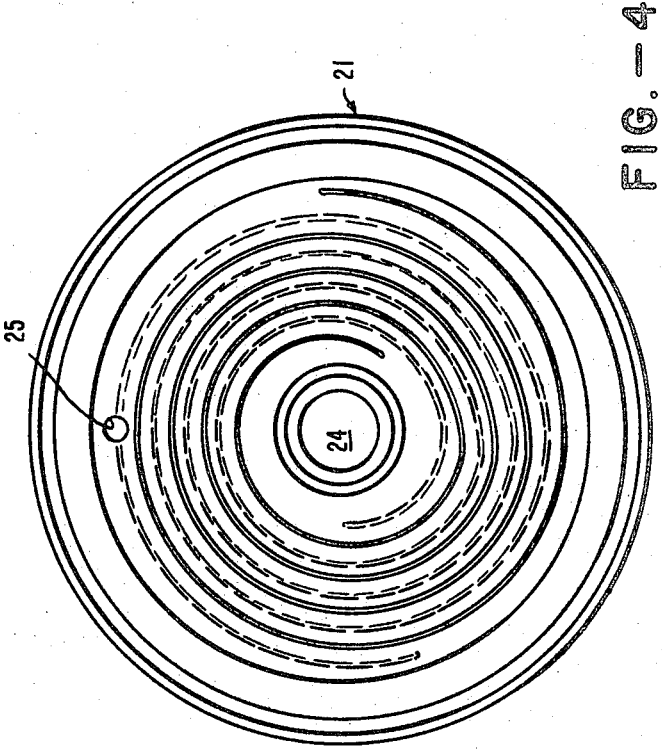
INVENTORS
FLEET E. NUTTALL
PAUL A. CANTOR
BY Edward O. Ansell
George J. Netter
ATTORNEYS

United States Patent Office 3,398,834
Patented Aug. 27, 1968

3,398,834
REVERSE OSMOSIS WATER PURIFICATION APPARATUS AND CELL THEREFOR
Fleet E. Nuttall, Alhambra, and Paul A. Cantor, West Covina, Calif., assignors to Aerojet-General Corporation, El Monte, Calif., a corporation of Ohio
Filed Oct. 10, 1966, Ser. No. 585,406
7 Claims. (Cl. 210—321)

ABSTRACT OF THE DISCLOSURE

A stack of reverse osmosis cells, each cell comprising an annular filter paper supporting annular reverse osmosis membranes on opposite sides thereof, the membranes overlapping the support at its inner periphery and flush with the support at its outer periphery, the cells having spiral guides therebetween, the cells and guides arranged so that there is successive, spiralling salt water flow across each membrane surface and fresh water flow from the outer periphery of the filter paper support.

---

The present invention relates to apparatus for the purification or demineralization of water, and, more particularly, to an improved purification cell for use in such apparatus.

In recent years there has been an increasing demand for apparatus that will inexpensively remove dissolved materials from water and thereby purify it to a form and condition suitable for human consumption. This has come about largely because of the decided population increase while normal supplies of drinking water have remained fairly constant, and, in fact, fallen off in many areas. There is also the ever growing danger of pollution of drinking water supplies from insecticides, detergents, and other organic and inorganic waste products.

Particularly in the urban areas, there has been a desire shown for water of higher purity than that normally obtainable from the tap. In the larger urban areas, higher purity water can usually be obtained through the purchase of bottled water; however, in the case of smaller communities and outlying areas, bottled water may be difficult, or impossible to obtain.

It is, therefore, a primary aim and purpose of the present invention to provide apparatus for removing mineralized material from water.

A further object of the invention is the provision of a water purification unit for demineralizing or purifying water which in its source state has a relatively low mineral content.

Another object of the invention is the provision of water purification apparatus operating on the reverse-osmosis principle and requiring relatively low hydraulic actuating pressure.

Still another object is the provision of water purification apparatus utilizing a reverse-osmosis cell of improved construction.

Yet another object is the provision of water purification apparatus having a long operational life, requiring little maintenance, and being of simple construction and inexpensive to manufacture.

Other objects and advantages of the invention will be manifest to those skilled in the art with reference to the accompanying drawings.

In the drawings:

FIG. 1 is an elevational view partially shown in section, of a purification apparatus constructed in accordance with the present invention.

FIG. 2 is an enlarged sectional view of a purification member or cell used in the apparatus of FIG. 1.

FIG. 3 is an exploded sectional view, shown in perspective, which illustrates schematically the flow of water through a portion of the apparatus of FIG. 1.

FIG. 4 is a plan view of a special member for separating individual purification cells of the apparatus.

FIG. 5 is an enlarged longitudinal sectional view showing a stacked assembly of several purification cells included in the apparatus of FIG. 1.

The fundamental basis upon which this invention relies to achieve demineralization is what is generally termed in the water purification art, the "reverse-osmosis" effect. That is, certain membranes or films have been found to permit ready passage of fresh water molecules therethrough, while minerals as well as other foreign matter are impeded from such passage. Certain of the more important factors determining the rate of reverse-osmosis purification are:

(a) concentration of solutes in the water;
(b) physical characteristics and structure of the membrane or film;
(c) chemical nature of the membrane or film;
(d) degree of impure water turbulence contacting the membrane or film; and
(e) the hydraulic pressure of the impure mineralized water exerted against the membrane.

Illustrative of reverse-osmosis membrane operation, if the membrane is disposed with relatively pure water on a first side and mineralized water on the other, it will be found that the pure water tends to permeate the membrane towards the mineralized water with practically no counter movement of the impure water. However, if the hydraulic (osmotic) pressure of the mineralized water is raised above a certain predeterminable threshold value, the fresh-water-to-mineralized-water permeation is stopped and a reverse movement of fresh water occurs from the mineralized water through the membrane to the fresh water supply.

Although a variety of different materials have been found to exhibit the reverse-osmosis effect, such as cellulose esters for example, one material that has shown itself to be excellent for present purposes is cellulose acetate. Construction of such a membrane is set forth in the U.S. Patent to S. Loeb et al., 3,133,132.

The equipment described here is particularly contemplated for treating relatively low mineralized content water to remove even that small amount of undesirable material that may be present, e.g., tap water. This fact has an important and advantageous operational benefit in permitting the use of relatively low hydraulic pressure to achieve the reverse-osmosis effect, since the required pressure is approximately directly proportional to the mineral content of the source water.

Turning now particularly to FIG. 1, the apparatus of the invention is seen to comprise in its major components a plurality of disc-like purification cells 10 arranged in stacked relation to form an overall cylindrical purification unit. The individual cells are held in a unitary relationship by a shaft or bolt 11 passing through the common opening formed by aligning individual openings at the center of the cells. End bells 12 and 13 are secured over the outermost cells of the stack by the bolt 11 and nut 11a to form an integral unitary structure. Source water to be purified enters the top-most portion via inlet line 14 and, in a way that will be gone into later below, is channeled to pass over the major surfaces of each of the purification cells 10 thereby making its way to the lowermost portion where the impure residue water passes to a drain at through an outlet line 15. Specific piping arrangements and valve means for accomplishing the lead-in of the source water to the purification cells 10 and the handling of reject or waste water have not been shown, since this is deemed to be primarily a matter of conventional design and does not bear directly on the operation of the invention.

In a manner and by a technique that will be clear after the description of the individual cells 10 below, the fresh or demineralized water provided by the unit is supplied at the outer surface or circumferential area portion formed by the stacked purification cells. Again, no specific apparatus for gathering the fresh water is shown, since it may take various forms, no one of which is necessary for satisfactory operation of the invention.

Each purification cell 10 includes a pair of identical reverse-osmosis membranes 16 and 17 of generally circular shape and having a centrally located opening 18. These membranes are sandwiched about a special liquid-absorbing and transferring member 19 of substantially similar dimensions. More particularly, the membranes are disposed in respective contacting relation to the major surface areas of the member 19. The central opening of the liquid-absorbing member 19 is greater than the opening 18 through the membranes 16 and 17, such that when assembled, portions 20 of the membranes extend beyond the radially inner edge of the opening in the liquid-absorbing member 19. The portions 20 are continuously and sealingly secured together by a suitable cementitious material, such as triacetin, for example. The outermost edges of the membranes are substantially coterminous or flush with that of the member 19 such that the outer periphery of the member 19 is maintained in free and unsealed condition.

Although other materials may be found satisfactory for use as the member 19, an excellent one is a resin impregnated filter paper commercially available under the trade designation Netone 5, No. 2602, manufactured by the National Filter Media Company. A layer of filter paper of this construction has both the necessary property of being able to readily transmit liquids along the layer plane, and also to be able to maintain this property in use and not "crush" closing the liquid-conducting spaces.

In use, pressurized source water applied to the outer surface areas of either or both membranes 16 and 17 causes demineralized water to permeate the membranes and saturate the absorbent member 19. As this action continues, a hydrostatic pressure is formed in the absorbent member 19 which coupled with the sealed condition of the radially inner edge portion thereof establishes a flow of fresh water in a direction toward the outer peripheral unsealed edge.

Turning now to FIG. 5, it is seen that each cell 10 is held spaced from its neighbor by a special separator member 21. This separator member is generally disc-like with raised portions 22 on each major surface arranged to form a continuous, spiral, liquid-conducting well 23. A centrally located opening 24 in the separator member is so dimensioned as to receive the shaft 11 in a closely fitting, although not necessarily sealing, arrangement. A second smaller opening 25 is located adjacent the outer periphery of the separator member 21 so as to extend within the well 23 and passes completely through the body portion. At the outer edge of the separator member 21 there are provided a pair of annular grooves 26 and 27, one on each major surface, immediately adjacent one another and extending completely around the separator member 21, which grooves do not communicate with the fluid conducting well 23. A circular raised portion 28 on each surface radially inwardly of the terminus of the raised portions 22 surrounds the central opening 24 and serves to isolate the well 23 from the opening 24.

In stacked relation, the raised portions 22 of the separator members 21 on each side of a cell 10 contact the surface of the corresponding membranes 16 and 17. O-ring sealing means 30 and 31 received within the annular grooves 26 and 27, respectively, prevent flow of source water radially outwardly between adjacent purification cells. An annular sealing washer 32 is compressingly received between the proximal circular raised portions 28 of successive members 21, thereby preventing flow of source water downwardly along the shaft while permitting flow between the outer periphery of the sealing washer 32 and the sealed portions 20, i.e., flow from the top side to the bottom side of each cell 10.

For the detailed passage of water through the apparatus, reference should be made to FIG. 3. Assume that initially the purification apparatus is disposed upright and incoming water to be treated is passing downwardly through the opening 25 in the upper separator member 21, as the arrow indicates. The water courses a spiral path over the membrane 17 defining the upper cell surface guided by the raised portions 22 on the lower surface of the upper separator member 21, the cell purifying the water as described earlier. When the water reaches the central opening 18 through the cell 10, it then passes between the radially inner edge of the cell 10 defined by the sealed portions 20 of the membranes 16, 17 and the outer peripheral surface of the annular sealing washer 32. The water now lies on the upper surface of the next separator member 21 and courses along that spiral path outwardly toward the outer periphery of the separator member 21, wetting the lower membrane 16 of the cell 10 while doing so. The process continues in this manner until all cells have been wetted, and the water which has not passed through a reverse-osmosis membrane is emptied to a suitable drain via outlet line 15.

While a particular embodiment of the invention has been illustrated and described, it will be understood that the invention should not be construed as being limited thereto, but only to the scope of the claims.

What is claimed is:

1. A purification cell for demineralizing liquids by reverse osmosis comprising: a pair of annular reverse osmosis membranes, a liquid-absorbing and transferring inner annular filter paper layer disposed between said pair of membranes in sandwiched relationship therewith, said membranes respectively engageably covering the entire opposite side surface areas of said inner filter paper layer, the radially inner marginal portions of said pair of membranes extending radially inwardly beyond the radially inner periphery of said inner filter paper layer and being directly secured to each other in sealed relationship, the outer peripheral edges of said pair of reverse osmosis membranes and said inner filter paper layer being disposed in substantially flush relationship, and said pair of reverse osmosis membranes and said filter paper layer sandwiched therebetween cooperating to define a unitary composite annular disc structure.

2. A purification cell as set forth in claim 1, wherein the side surface areas of said pair of reverse osmosis membranes and said inner filter paper layer disposed therebetween comprise annular radial surfaces of continuous uninterrupted extent.

3. A purification cell as set forth in claim 2, wherein said inner filter paper layer is resin-impregnated and is of sufficient rigidity to support said membranes engageably covering the entire opposite side surface areas thereof against collapse.

4. A purification apparatus for demineralizing liquids by reverse osmosis comprising: a plurality of purification cells arranged in stacked relationship; each of said cells comprising a pair of annular reverse osmosis membranes, a liquid-absorbing and transferring inner annular filter paper layer disposed between said pair of membranes in sandwiched relationship therewith, said membranes respectively engageably covering the entire opposite side surface areas of said inner filter paper layer, the radially inner marginal portions of said pair of membranes extending radially inwardly beyond the radially inner periphery of said inner filter paper layer and being directly secured to each other in sealed relationship, the outer peripheral edges of said pair of reverse osmosis membranes and said inner filter paper layer being disposed in substantially flush relationship, and said pair of reverse osmosis membranes and said filter paper layer sandwiched therebetween cooperating to define a unitary composite annular disc structure; means axially spacing adjacent cells apart and cooperating therewith to define a spaced area extending radially between the proximal membranes of respective adjacent cells, said plurality of stacked cells being provided with a fluid passage means extending therethrough through which liquid to be demineralized may flow for successively entering respective spaced areas defined between adjacent cells so as to expose the membranes of said cells to the liquid to be demineralized, whereby purified liquid from the liquid to be demineralized permeates the membranes to be absorbed by the inner filter paper layer of each cell and transmitted therethrough to the outer peripheral edge thereof to be discharged as a product liquid from each of the respective cells.

5. A purification apparatus for demineralizing liquids by reverse osmosis comprising: a plurality of purification cells arranged in stacked relationship; each of said cells comprising a pair of annular reverse osmosis membranes, a liquid-absorbing and transferring inner annular filter paper layer disposed between said pair of membranes in sandwiched relationship therewith, said membranes respectively engageably covering the entire opposite side surface areas of said inner filter paper layer, the radially inner marginal portions of said pair of membranes extending radially inwardly beyond the radially inner periphery of said inner filter paper layer and being directly secured to each other in sealed relationship, the outer peripheral edges of said pair of reverse osmosis membranes and said inner filter paper layer being disposed in substantially flush relationship, and said pair of reverse osmosis membranes and said filter paper layer sandwiched therebetween cooperating to define a unitary composite annular disc structure; a separator member disposed between and in contact with respective adjacent cells, each of said separator members having raised portions on the opposite side surfaces thereof forming a continuous spiral channel extending over each of the opposite side surfaces thereof, the raised portions on the opposite side surfaces of each of said separator members being in respective engagement with the proximal membranes of adjacent cells, the continuous spiral channels formed on the opposite side surfaces of each separator member defining a spaced area extending radially between the proximal membranes of respective adjacent cells, and said plurality of stacked cells being provided with a fluid passage means extending therethrough through which liquid to be demineralized may flow for successively entering respective spaced areas defined between adjacent cells so as to expose the membranes of said cells to the liquid to be demineralized, whereby purified liquid from the liquid to be demineralized permeates the membranes to be absorbed by the inner filter paper layer of each cell and transmitted therethrough to the outer peripheral edge thereof to be discharged as a product liquid from each of the respective cells.

6. A purification apparatus for demineralizing liquids by reverse osmosis comprising: a plurality of purification cells arranged in stacked relationship; each of said cells comprising a pair of annular reverse osmosis membranes, a liquid-absorbing and transferring inner annular filter paper layer disposed between said pair of membranes in sandwiched relationship therewith, said membranes respectively engageably covering the entire opposite side surface areas of said inner filter paper layer, the radially inner marginal portions of said pair of membranes extending radially inwardly beyond the radially inner periphery of said inner filter paper layer and being directly secured to each other in sealed relationship, the outer peripheral edges of said pair of reverse osmosis membranes and said inner filter paper layer being disposed in substantially flush relationship, and said pair of reverse osmosis membranes and said filter paper layer sandwiched therebetween cooperating to define a unitary composite annular disc structure; a separator member disposed between and in contact with respective adjacent cells, each of said separator members having raised portions on the opposite side surfaces thereof forming a continuous spiral channel extending over each of the opposite side surfaces thereof, the raised portions on the opposite side surfaces of each of said separator members being in respective engagement with the proximal membranes of adjacent cells, the continuous spiral channels formed on the opposite side surfaces of each separator member defining a spaced area extending radially between the proximal membranes of respective adjacent cells, and each of said separator members being provided with an opening extending axially therethrough, and the respective openings in successive separator members being located in diametrically opposite positions disposed radially outwardly with respect to the inner peripheries of said cells and cooperating with the central openings bounded by the inner peripheries of said cells to define a fluid passage means extending through said plurality of stacked cells through which liquid to be demineralized may flow for successively entering respective spaced areas defined between adjacent cells so as to expose the membranes of said cells to the liquid to be demineralized, whereby purified liquid from the liquid to be demineralized permeates the membranes to be absorbed by the inner filter paper layer of each cell and transmitted therethrough to the other peripheral edge thereof to be discharged as a product liquid from each of the respective cells.

7. A purification apparatus as set forth in claim 6, further including means sealing the marginal portion of each of said separator members disposed radially outwardly of the respective opening therein to the radially outer marginal portions of the proximal membranes of adjacent cells, an annular rib projecting from the opposite side surfaces of each of said separator members and being respectively disposed radially inwardly of said raised portions on the opposite side surfaces of said separator member and radially inwardly of the inner periphery of each respective cell, and annular sealing washers respectively spaced radially inwardly of the inner periphery of each of said cells and matingly engaging the proximal annular ribs of successive separator members to provide a sealed relationship therebetween.

References Cited

UNITED STATES PATENTS 2,364,366  12/1944  Jahreis _____ 210—433 X
3,133,132  5/1964  Loeb et al. _____ 210—22 X

OTHER REFERENCES

Keilin et al., "Design Criteria For Reverse Osmosis Desalination Plants," presented at the First International Symposium on Water Desalination, Washington, D.C., held Oct. 3–9, 1965, pp. 14 and 15 relied on.

R. and D. Progress Report No. 86 (By Aerojet-General Corp.), "Design and Construction of a Desalination Pilot Plant (A Reverse Osmosis Process)," for U.S. Office of Saline Water, Dept. of Interior Apr. 10, 1964, p. 3 and figs. 4 and 17–19 relied on.

REUBEN FRIEDMAN, *Primary Examiner.*

F. SPEAR, *Assistant Examiner.*